United States Patent
Morris et al.

(10) Patent No.: US 8,131,758 B2
(45) Date of Patent: Mar. 6, 2012

(54) TECHNIQUES FOR RECOGNIZING MULTIPLE PATTERNS WITHIN A STRING

(75) Inventors: Cameron Craig Morris, Saratoga Springs, UT (US); Lloyd Leon Burch, Payson, UT (US); Srinivas Vedula, Orem, UT (US)

(73) Assignee: Novell, Inc., Provo, UT (US)

( * ) Notice: Subject to any disclaimer, the term of this patent is extended or adjusted under 35 U.S.C. 154(b) by 418 days.

(21) Appl. No.: 11/964,163

(22) Filed: Dec. 26, 2007

(65) Prior Publication Data

US 2009/0171953 A1 Jul. 2, 2009

(51) Int. Cl.
*G06F 7/00* (2006.01)
(52) U.S. Cl. ......................................................... 707/778
(58) Field of Classification Search .................. None
See application file for complete search history.

(56) References Cited

U.S. PATENT DOCUMENTS

| | | | |
|---|---|---|---|
| 4,858,106 A | 8/1989 | Mattheyses | |
| 5,655,129 A * | 8/1997 | Ito | 704/10 |
| 5,893,116 A * | 4/1999 | Simmonds et al. | 709/229 |
| 5,983,223 A * | 11/1999 | Perlman | 707/6 |
| 6,359,574 B1 | 3/2002 | Yariv | |
| 6,563,949 B1 | 5/2003 | Takebe | |
| 6,738,515 B1 | 5/2004 | Akagi | |
| 6,785,677 B1 | 8/2004 | Fritchman | |
| 6,978,044 B2 | 12/2005 | Akagi | |
| 7,036,016 B1 * | 4/2006 | Smith, Jr. | 713/185 |
| 7,103,750 B2 | 9/2006 | Helsley et al. | |

\* cited by examiner

*Primary Examiner* — Truong Vo
(74) *Attorney, Agent, or Firm* — Schwegman, Lundberg & Woessner, P.A.

(57) ABSTRACT

Techniques for recognizing multiple patterns within a string of characters are presented. A dictionary is hierarchically organized, such that leaf nodes within the dictionary represents words defined in the dictionary. A string of characters are received. Each character within the string is traversed by attempting to match it with a character defined in the dictionary. As long as a match continues with the dictionary the characters within the string are traversed. Once a longest possible match to a word within the dictionary is found, the next character following the last matched character for the string is processed.

21 Claims, 3 Drawing Sheets

TECHNIQUES FOR RECOGNIZING MULTIPLE PATTERNS WITHIN A STRING

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright©2007, Novell®, Inc. of Provo, Utah—All Rights Reserved.

BACKGROUND

A variety of automated software applications or services often have a need to recognize a variety of information contained within a stream of characters or a string. For example, password analysis programs may want to prohibit commonly used words from being present in user-defined passwords. Word processors may also like to detect when a user forgot to put a space between words being used to assist or automatically correct the situation for the user. Even automated services that take command inputs that are delineated by special characters may want to automatically detect when a user has missed a delineator in a command input string.

In the password analysis scenario, these programs often do little more than attempt to match the password with words in a dictionary and maybe also consider a few acceptable mutations, such as replacing an "a" character with an "@" character. But, a user can add a few characters in the front, back, or even in the middle of a password and essentially render the analysis program useless. Still further, by just concatenating two words together in a password, the user can achieve something the password analysis programs are designed to prevent.

The present techniques used in the industry attempt to accomplish word recognition within strings by breaking a given string into all its possible permutations or combinations; each permutation is then compared against words housed in flat databases. However, long strings are extremely problematic and take a heavy toll on processor and memory resources. With conventional approaches, if the length of the string being processed is N then the amount of substring permutations and database lookups is $N^2$. It is apparent that for any decent sized string this approach is resource prohibitive.

Thus, what is needed is an improved mechanism for recognizing patterns within a string.

SUMMARY

In various embodiments, techniques for recognizing patterns within a string are provided. More specifically, and in an embodiment, a method is presented for recognizing multiple characters within a string. Initially, characters from words are organized into a hierarchy. The words are housed in a dictionary and each first character of a particular word appears as a node within the hierarchy. Moreover, each leaf node of the hierarchy represents a particular one of the words. Next, a target string is subsequently received. Each target character of the string is iterated and an attempt is made to assemble a substring of the target characters, which match to a particular leaf node of the hierarchy within the dictionary. Finally, multiple target words from the target string are identified and in response matched substrings found.

DETAILED DESCRIPTION

Various embodiments of this invention can be implemented in existing network architectures, security systems, data centers, and/or communication devices. For example, in some embodiments, the techniques presented herein are implemented in whole or in part in the Novell® proxy server products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
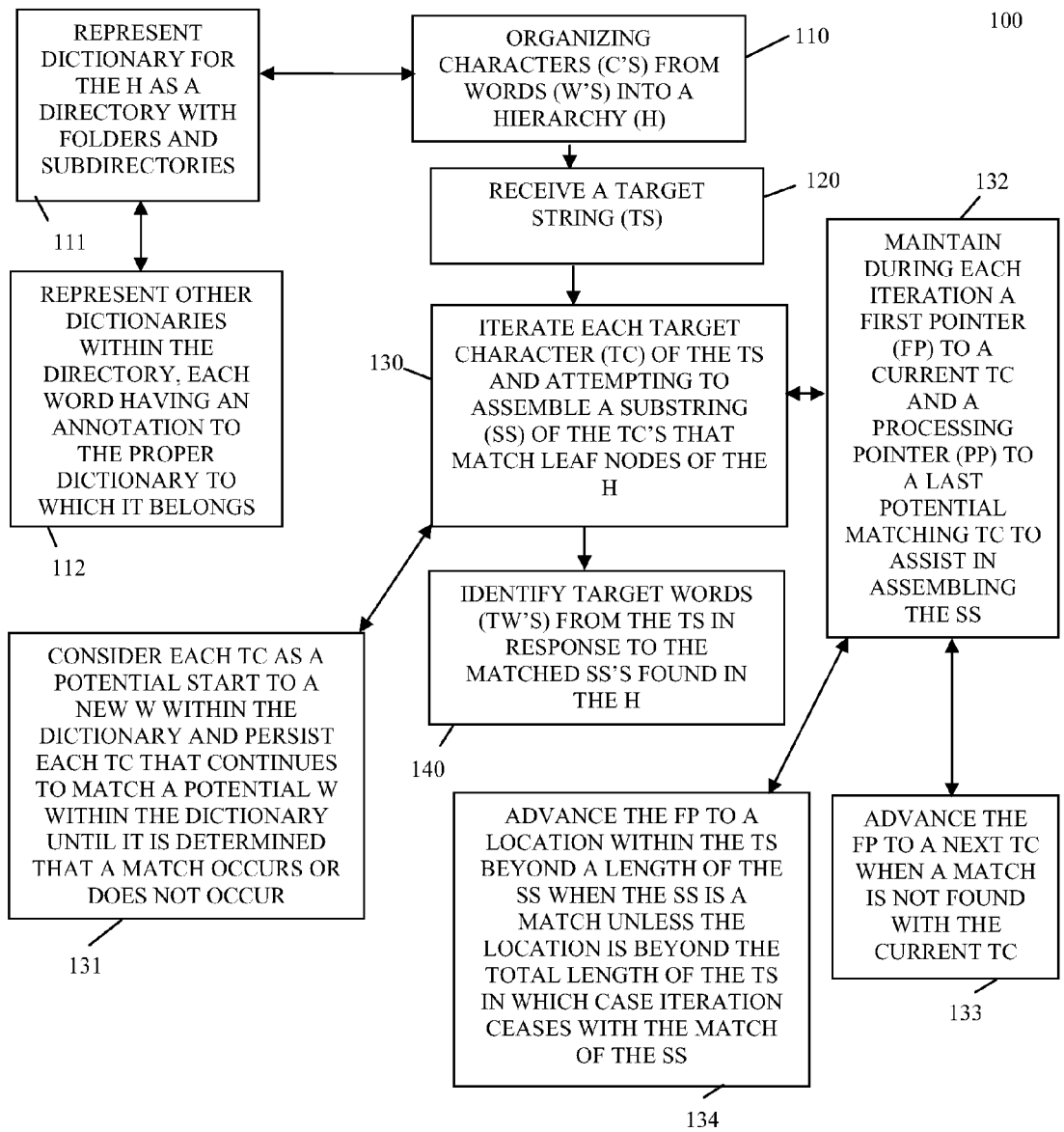
FIG. 1 is a diagram of a method for recognizing multiple characters within a string, according to an example embodiment.

FIG. 1 is a diagram of a method 100 for recognizing multiple characters within a string, according to an example embodiment. The method 100 (hereinafter "word recognition service") is implemented as instructions in a machine-accessible and readable medium. The instructions when executed by a machine perform the processing depicted in FIG. 1. The word recognition service is also operational over and processes within a network. The network may be wired, wireless, or a combination of wired and wireless.

As used herein the term "dictionary" may be used interchangeably with "database" or "data store." The dictionary holds terms. The terms may be common words, domain specific words, acronyms, abbreviations, colloquialisms, proper names, common misspellings of any of the aforementioned items, etc. Other metadata information may be housed with the terms as well, such as but not limited to dictionary identifiers that identify a particular dictionary associated with the terms, etc. It is also noted that the terms "word" and "term" may be used synonymously and interchangeably herein.

It is within this context that the processing associated with the word recognition service is now discussed with reference to the FIG. 1.

At 110, the word recognition service organizing characters from words into a hierarchy. The words are housed in a dictionary. Each first character of a particular word appears as the start of a node within the hierarchy. Each leaf node of the hierarchy represents a particular one of the words.

In an embodiment, the characters of the dictionary are structured in a hierarchy that is arranged in a tree structure. The first or root node is an "a" character. Characters can repeat in the tree, such that an "a" can have another "a" under, as would be the case with the word "aardvark," where there are to "a's" back to back. A sample tree for a subset of the tree may appear as follows within the dictionary that is organized hierarchically.

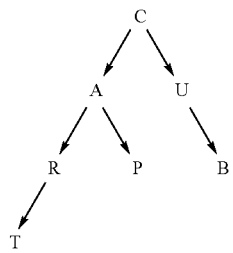

Leaf nodes are words, so the leaf node "T" forms the word "CART;" the leaf node "P" forms the word "CAP; and the leaf node "B" forms the word "CUB." It is also noted that intermediate nodes can be words as well; so, the intermediate node "R" forms its own word "CAR" and is also part of the word "CART," which is associated with the word "CART."

It is noted that although the hierarchy presented appears to be a binary tree in the example; the dictionary does not have to be so limited. Thus, the root node in the example C may have a plurality of other children besides just the "A" and "U." So, the root node "C" may have other children nodes in the dictionary, such as "E," "I," "H," etc. Each of the children of the root node begins a path toward a word for the dictionary. Again, leaf nodes are words and some intermediate nodes may be words as well.

In an embodiment, at 111, the word recognition service organizes and implements the dictionary hierarchy as a directory with folders (subdirectories) and files. The root of the dictionary is a root directory in a directory system. So, the directory may be named as "a." for a particular dictionary. As you traverse, into the "a" directory that are folders (subdirectories) within the folders may be other folders or containers. A container includes letters representing a particular word of the dictionary. Alternatively, the container may include a single file with a single letter in it; the entire word representing the letter in the file is formed by the directory path used to reach the file. So, the hierarchy does not have to be a table or even an in memory constructed data structure. The hierarchy may be formed via directories, folders (subdirectories) and files.

Continuing with the embodiment at 111, the word recognition service, at 112, can organize and manage multiple other dictionaries within the directory and directory system. With multiple different dictionaries, each word of within the directory includes annotations. The annotation identifies the origin of the word, such that when a particular word is found the identity of the dictionary associated with it is discovered. A single word can be associated with multiple dictionaries and may even include linkages to other equivalent foreign language words associated with other spoken languages and other dictionaries entirely. This can be useful to have various different domain specific lexicons or even cross and different spoken languages all linked and organized within the directory.

At some point after the dictionary (or even multiple dictionaries as described above) is organized as a hierarchy, the word recognition service, at 120, receives a target string. There may be a variety of reasons for invoking the word recognition service with a target string. For example, a password service may desire to detect whether a user submitting a password has included multiple different common or prohibitive words in a submitted password. In another case, a word processing system may want to detect if a user of a word processor has typed a string but neglected to include a delimiter character (space, hyphen, etc.), such that there are multiple words in contained in what the user typed.

In still another situation, any program or service may receive instructions or even command parameters from a mistyped string supplied by a user. Here, the program or service submits the string to the word recognition service for purposes of having the proper commands or instructions parsed from the string before assuming the commands or instructions are in error. It is apparent that there are a variety of useful situations in which a string may be submit by an entity (user, automated program, automated service, etc.) such that the word recognition service receives that target string for processing at 120.

At 130, the word recognition service iterates each target character of the target string and attempts to assemble substrings of the target characters that match to a particular leaf node of the hierarchy or a intermediate node that is a word. An intermediate node may be functionally equivalent to a leaf node by including an annotation indicating that although it is not technically a leaf node, it is a recognized word of the dictionary and should therefore be considered to be a logical leaf node.

The traversal of the characters included in the target string can be done in a variety of manners.

For example, at 131, the word recognition service considers each target character that is presenting being processed as a potential start to a new word within the dictionary. Each target character is persisted (its location is retained during processing so it is retrievable) as long as it continues to match a potential word within the dictionary. The target character is released once it is determined that it does not match or does not form part of any word within the dictionary.

A mechanism for the word recognition service to achieve the processing discussed at 130 and 131 can be achieved in a variety of manners when the dictionary is hierarchy organized.

As an example, at 132, the word recognition service maintains during each iteration a first pointer to a current target character that is a potential start to a word within the dictionary. There is also a processing pointer maintained to a last potential match of a target character.

At 133, the first pointer is advanced to a next character in the target string just past the current target character when a match within the dictionary is not found with the current target character.

At 134, the word recognition service advances the first pointer to a location within the target string beyond a length of the substring when the substring is a match to a particular word in the dictionary unless the location is beyond a total length of the target string, which indicates that the iteration has ceased and the end of the target string is reached.

For example, the processing discussed at 130-134 can be handled in the following manner by the word recognition service when a given target string is received at 120 as "AABASEBALLHAT." Visual inspection readily tells a human that there are two words in this string, namely "BASEBALL" and "HAT." However, having a software program determine this can be extremely processor and memory intensive if convention approaches are used (as discussed above in the Background Section). The techniques presented herein achieve rapid and efficient processing to resolve the two words.

This is done by parsing the string "AABASEBALLHAT" and concurrently traversing a hierarchically organized dictionary. So, to start a first pointer is placed on the first A of the string; obviously a match is found in the dictionary on A as there are many potential words that start with A. The next A is acquired and it too is retained, since at least one word "aardvark" includes two successive "a's." The next character B is not found while traversing the dictionary hierarchy, since there are no words that start or end with "AAB." In this case, the first pointer is advanced to the second A. This results in no match again and the first pointer is advanced to B. Here, the first pointer stays on B until the H is reached and then it is advanced from B for a length of 8 characters (length of the word BASEBALL) and the first pointer now points at H. This continues until HAT is found. The process results in two words found in the string BASEBALL and HAT. This was done without taking every conceivable permutation substrings.

At 140, the word recognition service identifies target words from the target string in response to the substrings found in hierarchy organized dictionary. These words can then be returned to the original process and used in the manners desired by those services. So, a password service can allow or deny a password being offered by a user. A word process can auto correct a string entered by a user without proper delineation and an automated service can use proper commands without raising an error unnecessarily.

An example, set of pseudo code for a routing that performs the parsing of the string and the traversal of the hierarchically organized dictionary may appear as follows:

```
foreach( letter in string )
{
   possibleMatches.add( rootNode )
   foreach( node in possibleMatches )
   {
      if (node.isMatch(letter))
      {
         node.addLetter(letter)
         if (node.isWord( ))
            foundWords.add(node.getWord( ))
      }
      else
         possibleMatches.remove(node)
   }
}
                         © Novell, Inc. 2007
```

The method addLetter lets the node advance to the next letter in the directory, and to keep track of which letters of the string are used for an identified word.

One now appreciates how a dictionary can be hierarchically organized. A string is received and parsed and each target character processed by traversing the dictionary for matches. Examples of this were provided above as well as some example pseudo code. This approach permits rapid detection of multiple words included in a single string. Other various enhancements, alterations, and perspectives of this approach are now discussed in greater detail with reference to the FIGS. 2-4.

Figure 2:
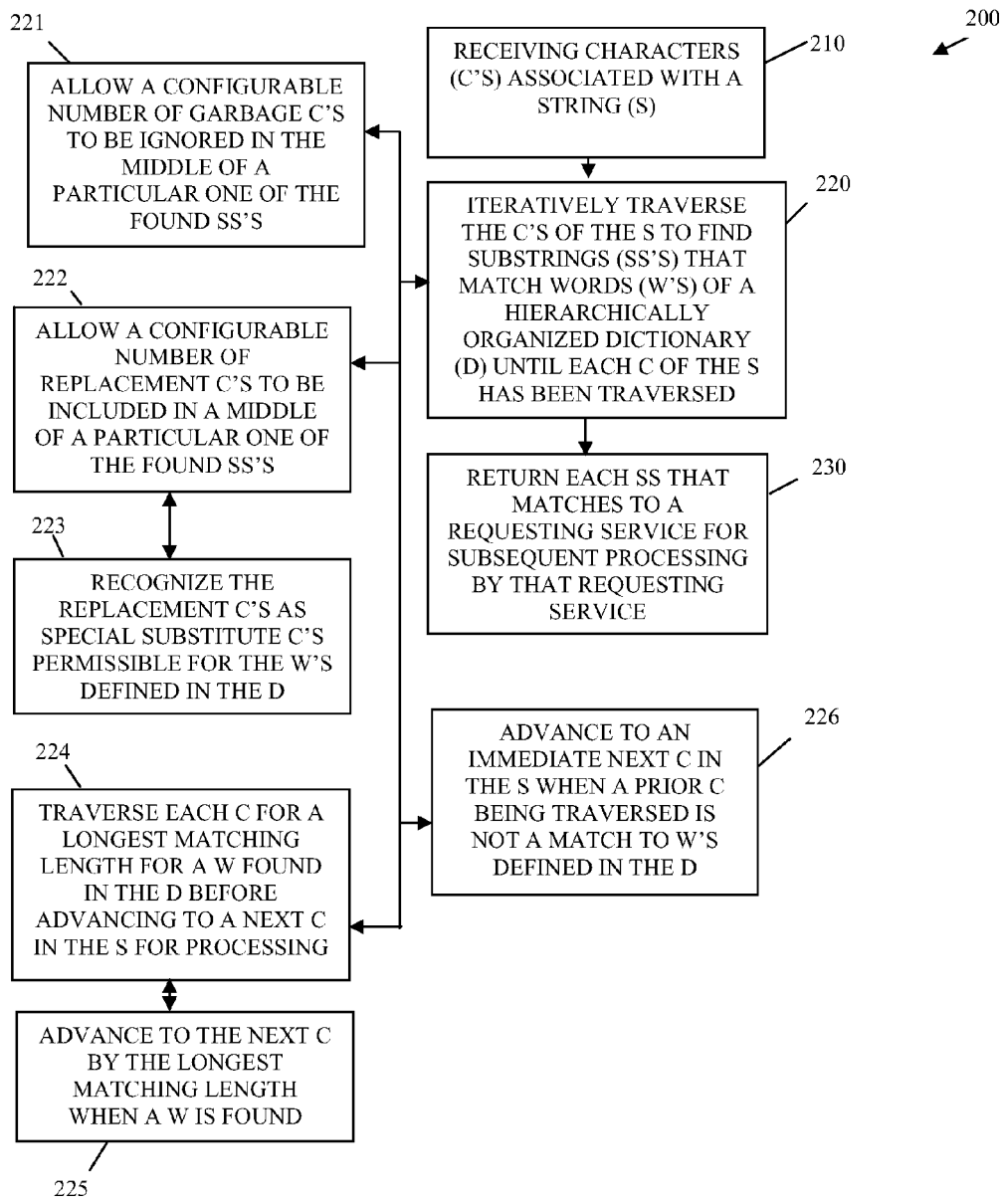
FIG. 2 is a diagram of another method for recognizing multiple characters within a string, according to an example embodiment.

FIG. 2 is a diagram of another method 200 for recognizing multiple characters within a string, according to an example embodiment. The method 200 (hereinafter "substring matching service" is implemented in a machine-accessible and readable medium as instructions. The instructions when executed by a machine perform the processing depicted in the FIG. 2. Moreover, the substring matching service is operational over a network, and the network may be wired, wireless, or a combination of wired and wireless.

The processing associated with the substring matching service represents an enhanced and in some cases more detailed perspective of the word recognition service represented by the method 100 and described within the context of the FIG. 1.

At 210, the substring matching service receives characters associated with a string. The string is received from a requesting service. Some example requesting services were discussed in detail above with reference to the method 100 of the FIG. 1.

At 220, the substring matching service iteratively traverses the characters of the string to find substrings that match words of a hierarchically organized dictionary. Examples and techniques for hierarchically organizing a single dictionary or multiple dictionaries linked together were discussed in detail above with reference to the method 100 of the FIG. 1. The processing and traversal continues until each character of the string has been parsed or traversed.

According to an embodiment, at 221, the substring matching service allows a configurable number of garbage characters to be ignored within in the middle of any particular one of the substrings that are found. For example, suppose a particular substring of the string appears as follows PASKKSWORD, where the word PASSWORD appears but for the two garbage K characters that appear after the first S. Suppose further that a maximum of 2 garbage characters are permitted to be in the middle of any word being matched. Here, by allowing the two K's to be ignored the proper word PASSWORD is found.

Some example pseudo code for achieving the processing at 221 may be implemented as follows.

The previous algorithm (above with reference to the method 100 of the FIG. 1) detects words with garbage text before and after a word but not within a word. Allowing for the insertion of additional characters into the word is detected with the following modification to that algorithm, which again was discussed above with reference to the method 100 of the FIG. 1:

```
foreach( letter in string )
{
   possibleMatches.add( rootNode )
   foreach( node in possibleMatches )
   {
      if (node.isMatch(letter))
      {
         node.addLetter(letter)
         if (node.isWord( ))
            foundWords.add(node.getWord( ))
      }
      else if (node.allowExtraCharacter( ))
         node.addExtraCharacter(letter)
      else
         possibleMatches.remove(node)
   }
}
© Novell, Inc. 2007
```

The method allowExtraCharacters keeps track of how many extra characters have been allowed and lets the implementation prevent adding too many characters. The method addExtraCharacters is similar to the addLetter method, only it does not advance the pointer into the directory.

At 222, the substring matching service allows a configurable number of replacement characters to be included in the middle of a particular one of the found substrings. At 223, the substring matching service recognizes the replacement characters as special substitute characters that are permissible for the words defined in the hierarchically organized dictionary.

So, not only can garbage characters appear in the middle of a found substring but special replacement of substitute characters may be found. For example, suppose a string appeared as PA**WORD; here the "*'s" are replacement or special characters representing an S. When the each * is replaced with an S, the word PASSWORD is found.

So, the above discussed algorithms can be extended to detect special character substitutions of dictionary words. This is done by adding all child nodes of a node that found a special character when traversing the dictionary. The modified algorithm then appears as follows:

```
foreach( letter in string )
{
    possibleMatches.add( rootNode )
    foreach( node in possibleMatches )
    {
        if (node.isMatch(letter))
        {
            node.addLetter(letter)
            if (node.isWord( ))
                foundWords.add(node.getWord( ))
        }
        else
            if (letter.isSpecialChar( ) &&
            node.allowSpecialSubstitution(letter))
            {
                children = node.buildChildren(letter);
                possibleMatches.addAll(children);
            }
            possibleMatches.remove(node);
    }
}
```
© Novell, Inc. 2007

The method buildChildren creates new nodes for each child of the current node.

According to an embodiment, at 224, substring matching service traverses each character for a longest matching length for a word found in the dictionary before advancing to a next character in the string for processing. In other words, the longest possible substring contained within the string received and matched in the dictionary is acquired before the next character in the string is processed. At 225, the next character is the character located within the string at a position from the start of the word found in the string for the length of the word found. So, if the word is 4 characters in length and the start of the word is at character position 2 in the string then the next character advanced to within the string for processing is at character position 6 (2+4=6). Again, an example of this was discussed in greater detail above with reference to the method 100 of the FIG. 1.

In another case, at 226, the substring matching service advances to an immediate next character in the string when a prior character being traversed is not a match to any words defined in the dictionary. In other words, if the character being processed is not associated with any known word in the dictionary then the immediate next character that follows that character in the string is processed as a new potential start to a word in the dictionary. So, if the substring matching service is at position 2 and no match is found then processing starts again at position 3. Again, example processing associated with this was discussed in detail above with reference to the method 100 of the FIG. 1.

Finally, at 230, the substring matching service returns each substring that matches to a requesting service for subsequent processing by that requesting service. At this point, the requesting service receives each word found in the string and can use that string as the requesting service sees fit. Example situations that may occur were discussed in detail above with respect to some example requesting services that have use for resolving words contained within a string.

Figure 3:
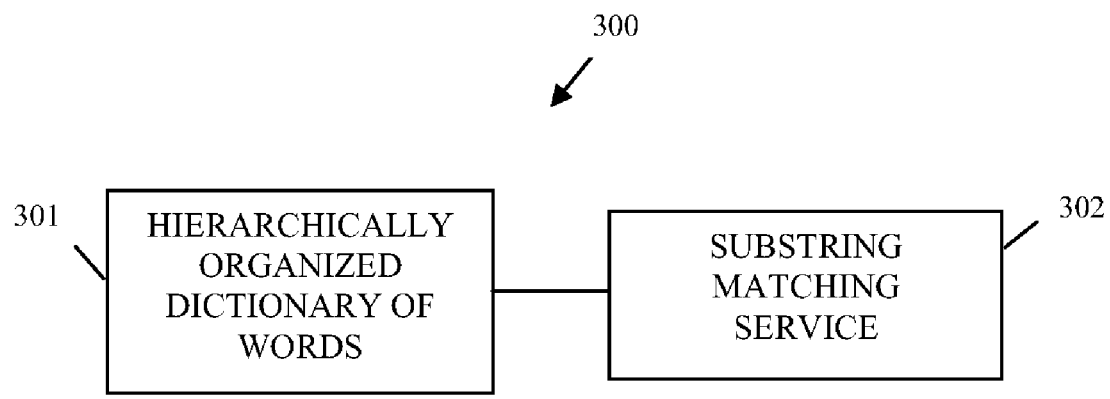
FIG. 3 is a diagram of a substring word recognition system, according to an example embodiment.

FIG. 3 is a diagram of a substring word recognition system 300, according to an example embodiment. The substring word recognition system 300 is implemented as instructions on or within a machine-accessible and readable medium. The instructions when executed by a machine perform processing depicted with respect to the method 100 of the FIG. 1 and the method 200 of the FIG. 2. The substring word recognition system 300 is also operational over a network and the network may be wired, wireless, or a combination of wired and wireless. In some cases the network is the Internet or a wide-area network (WAN).

The substring word recognition system 300 includes a hierarchically organized dictionary of words 301 and a substring matching service 302. Each of these will now be discussed in turn.

The hierarchically organized dictionary of words 301 is implemented in a machine-accessible and computer-readable medium and is accessible to the substring matching service 302 that processes on a machine (computer, processing device, etc.).

In an embodiment, the hierarchically organized dictionary of words 301 is organized as a tree data structure where leaf nodes of the tree data structure represents words defined within the dictionary. Intermediate nodes within the tree data structure may also include annotations to make them appear as logical leaf nodes when the dictionary is being traversed. Examples and details of this particular approach was discussed above in detail with reference to the method 100 of the FIG. 1.

According to an embodiment, the hierarchically organized dictionary of words 301 is dynamically created in memory or in cache on behalf of the substring matching service 302. So, the hierarchically organized dictionary of words 301 can be created in real time, on demand, and on-the-fly when needed.

In another case, the hierarchically organized dictionary of words 301 is organized as a series of directories where the files within the directories represents words defined in the dictionary. Examples and details of this particular approach was discussed above in detail with reference to the method 100 of the FIG. 1.

The substring matching service 302 is implemented in a machine-accessible and computer-readable medium and is to process on the machine. Example processing associated with the substring matching service 302 was described in detail above with reference to the methods 100 and 200 of the FIGS. 1 and 2, respectively.

The substring matching service 302 parses each character of a target string looking for a longest successive match of a substring of characters within the hierarchically organized dictionary of words 301. The hierarchically organized dictionary of words 301 returns each of the substrings found to a requesting service for subsequent processing and manipulation by that requesting service.

According to an embodiment, the substring matching service 302 permits a configurable number of garbage or replacement characters to appear or to be ignored for some of the found substrings. Examples and details of this particular approach was discussed in detail above with reference to the method 200 of the FIG. 2.

In an embodiment, the substring matching service 302 finds at least two or more substrings in the hierarchically organized dictionary of words 301 for the target string being processed.

Figure 4:
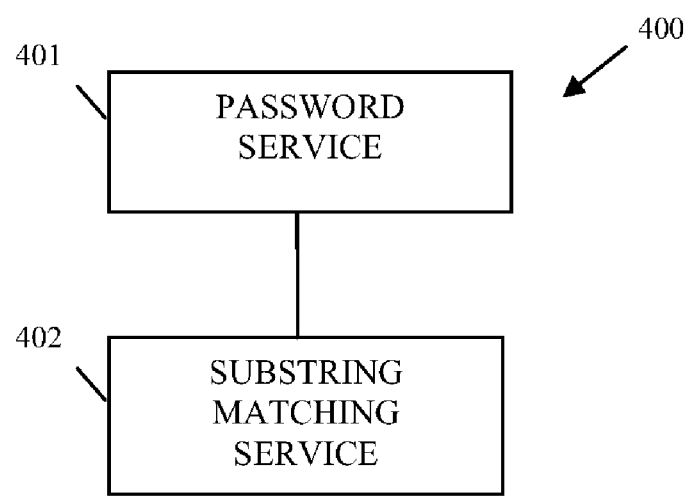
FIG. 4 is a diagram of another substring word recognition system, according to an example embodiment.

FIG. 4 is a diagram of another substring word recognition system 400, according to an example embodiment. The substring word recognition system 400 is implemented as instructions on or within a machine-accessible and readable medium. The instructions when executed by one or more machines also perform, among other things; the processing depicted with respect to the method 100 of the FIG. 1 and the method 200 of the FIG. 2. The substring word recognition system 400 is also operational over a network and the network may be wired, wireless, or a combination of wired and wireless.

The substring word recognition system 400 represents a particular implementation of the methods 100 and 200 of the FIGS. 1 and 2, which is utilized within the context of password management and administration.

The substring word recognition system 400 includes a password service 401 and a substring matching service 402. Each of these will now be discussed in turn.

The password service 401 is implemented in machine-accessible and readable medium and is to process on a machine (computer, processing device, etc.).

The password service 401 is one type of requesting service that has a need for determining whether a supplied string, in this case a password, includes multiple different words contained within it. Other example requesting services were discussed above with reference to the methods 100 and 200 of the FIGS. 1 and 2, respectively and with system 300 of the FIG. 3.

The password service 401 passes or supplies passwords that are received as strings by the substring matching service 402. Once words are found in the string by the substring matching service 402, the substring matching service 402 returns the words to the password service 401. At his point the password service 401 uses or evaluates a policy for subsequent action.

In an embodiment, the policy evaluation performed by the password service 401 indicates that the password service 401 is to preclude a particular password offered by a user when a found substring (returned by the substring matching service 402) matches a particular word of the hierarchically organized dictionary that the policy prohibits.

In another scenario, the policy evaluation indicates that the password service 401 is to preclude a password from use when a configurable number of found substrings (multiple words) matches multiple words within the hierarchically organized dictionary. So, the policy may permit one word but two words may be prohibited. The number of allowed versus disallowed words is dictated by the policy.

The substring matching service 402 is implemented in a machine-accessible and computer-readable medium and is to process on the same machine as the password service 401 or an entirely different machine from that which is associated with the password service 401. Example processing associated with the substring matching service 402 was described in detail above with reference to the methods 100 and 200 of the FIGS. 1 and 2, respectively, and with respect to the system 300 of the FIG. 3.

The substring matching service 402 identifies the substrings included in the passwords supplied by the password service 401 by searching the hierarchical organized dictionary of words and when matching substrings are found they are returned by the substring matching service 402 to the password service for subsequent action; some of which were discussed above.

According to an embodiment, the substring matching service 402 permits a configurable number of garbage or replacement characters to be ignored or substituted when attempting to match the substrings to the words of the hierarchically organized dictionary of words. Examples and details of this approach was discussed in detail above with reference to the method 200 of the FIG. 2.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
   organizing characters from words into a hierarchy, the words are obtained from a dictionary and organized into the hierarchy, each node of the hierarchy representing a single character representing a single letter and each first character of a particular word appears as a particular node within the hierarchy, and each leaf node of the hierarchy represents a particular one of the words, each word representing a common word, a domain specific word, an acronym for that word, a colloquialism for that word, an abbreviation for that word, a proper name, or a common misspelling for that word, and representing the dictionary as a directory where each character from each word is stored as its own independent subdirectory and a folder within the directory, each word also including an annotation indicating the origin of that word;
   receiving a target string;
   iterating each target character of the string and attempting to assemble a substring of the target characters that match to a particular leaf node of the hierarchy; and
   identifying target words from the target string in response matched substrings found.

2. The method of claim 1, wherein iterating further includes considering each target character as a potential start to a new word within the dictionary and persisting each target character that continues to match a potential word within the dictionary until it is determined that a match occurs or does not occur.

3. The method of claim 1, wherein iterating further includes maintaining, during each iteration, a first pointer to a current target character and a processing pointer to a last potential matching target character to assist in assembling the substring.

4. The method of claim 3, wherein iterating further includes advancing the first pointer to a next target character when a match is not found with the current target character.

5. The method of claim 3, wherein iterating further includes advancing the first pointer to a location within the target string beyond a length of the substring when the substring is a match unless the location is beyond a total length of the target string in which case iterating ceasing with the match of the substring.

6. A machine-implemented method, comprising:
receiving characters associated with a string each character representing a single letter;
iteratively traversing the characters of the string finding substrings that match words of a hierarchically organized dictionary until each character of the string has been traversed, the hierarchically organized dictionary is a hierarchy where each node is a single character and where each leaf node represents a particular one of the words, and each word representing a common word, a domain specific word, an acronym for that word, a colloquialism for that word, an abbreviation for that word, a proper name, or a common misspelling for that word, the hierarchically organized dictionary stored as a directory where each character of each word is stored as its own independent sub-directory and a folder within the directory and each word including an annotation indicating an origin of that word; and
returning each substring, which is found from the string and that is also located in the hierarchically organized dictionary, to a requesting service for subsequent processing by that requesting service.

7. The method of claim 6, wherein iteratively traversing further includes allowing a configurable number of garbage characters to be ignored in a middle of a particular one of the found substrings.

8. The method of claim 6, wherein iteratively traversing further includes allowing a configurable number of replacement characters to be included in a middle of a particular one of the found substrings.

9. The method of claim 8, wherein allowing further includes recognizing the replacement characters as special substitute characters permissible for dictionary words defined in the hierarchically organized dictionary.

10. The method of claim 6, wherein iteratively traversing further includes traversing each character for a longest matching length for a word found in the hierarchically organized dictionary before advancing to a next character in the string for processing.

11. The method of claim 10, wherein traversing further includes advancing to the next character by the longest matching length when a word is found, the longest matching length representing a word length for the word found.

12. The method of claim 6, wherein iteratively traversing further includes advancing to an immediate next character in the string when a prior character being traversed is not a match to words defined in the hierarchically organized dictionary.

13. A system, comprising:
a hierarchically organized dictionary of words residing in a machine-accessible and computer-readable medium and accessible to a substring matching service that executes on a machine, the hierarchically organized dictionary of words stored in the machine-accessible and computer-readable medium as a directory where each character of each word is stored as its own independent sub-directory and a folder of the directory, and each word including an annotation indicating an origin of that word;
the substring matching service implemented in a machine-accessible and computer-readable medium and to process on the machine;
the substring matching service parses each character of a target string looking for a longest successive match of a substring of those characters within the hierarchically organized dictionary, each character representing a letter, the hierarchically organized dictionary of words is assembled so that each node of a hierarchy is a single character and each leaf node presents a particular word from the hierarchically organized dictionary of words and the substring matching service returns each of the substrings found to a requesting service for subsequent processing and manipulation by that requesting service, and each word representing a common word, a domain specific word, an acronym for that word, a colloquialism for that word, an abbreviation for that word, a proper name, or a common misspelling for that word.

14. The system of claim 13, wherein the hierarchy is organized as a tree data structure where the leaf nodes of the tree data structure represents the words defined in the hierarchically organized dictionary of words.

15. The system of claim 14, wherein the tree data structure is dynamically created as in memory or in cache data on behalf of the substring matching service.

16. The system of claim 13, wherein the substring matching service permits a configurable number of garbage or replacement characters to appear or to be ignored for some of the found substrings.

17. The system of claim 13, wherein substring matching service finds at least two or more substrings in the hierarchically organized dictionary for the target string being processed.

18. A system, comprising:
a password service implemented in a machine-accessible and computer-readable medium and is to process on a machine; and
a substring matching service implemented in a machine-accessible and computer-readable medium and is to process on the machine or a different machine;
wherein the password service passes passwords received as strings to the substring matching service, and the substring matching service identifies the substrings included within those passwords by searching a hierarchically organized dictionary of words and when matching substrings are found returning the matching substrings to the password service for evaluation against a policy and for subsequent action by the password service and the hierarchically organized dictionary of words is organized as a hierarchy, each node representing a single character and each leaf node represent a particular word from the hierarchically organized dictionary of words, each character representing a letter and, each word representing a common word, a domain specific word, an acronym for that word, a colloquialism for that word, an abbreviation for that word, a proper name, or a common misspelling for that word, and the hierarchically organized dictionary of words stored in the machine-accessible and computer-readable medium as a directory where each character of each word is stored as its own independent sub-directory and a folder of the directory and each word including an annotation indicating an origin of that word.

19. The system of claim 18, wherein the substring matching service permits a configurable number of garbage or replacement characters to be ignored when attempting to match the substrings to the words of the hierarchically organized dictionary.

20. The system of claim 19, wherein the policy precludes a particular password from being used when a particular found substring matches a particular word of the hierarchically organized dictionary.

21. The system of claim 20, wherein the policy precludes a particular password from being used when a configurable number of found substrings matches for multiple words within the hierarchically organized dictionary.

* * * * *